United States Patent [19]

Baumanns

[11] 4,269,590
[45] May 26, 1981

[54] RADIANT BURNER

[76] Inventor: Herbert Baumanns, Beller Strasse 187, 4070 Rheydt, Fed. Rep. of Germany

[21] Appl. No.: 2,166

[22] Filed: Jan. 9, 1979

Related U.S. Application Data

[63] Continuation of Ser. No. 877,431, Feb. 13, 1978, abandoned.

[30] Foreign Application Priority Data

Feb. 12, 1977 [DE] Fed. Rep. of Germany ....... 2706043

[51] Int. Cl.³ .......................................... F23D 13/12
[52] U.S. Cl. ................................... 431/210; 431/215; 431/328; 126/92 B
[58] Field of Search ............... 431/210, 215, 328, 329; 126/92 B, 92 C, 92 AC

[56] References Cited

U.S. PATENT DOCUMENTS

| 1,899,988 | 3/1933 | Ruemelin | 165/179 |
|---|---|---|---|
| 2,004,252 | 6/1935 | Sorensen | 165/179 |
| 3,212,554 | 10/1965 | Blaha | 431/215 |
| 3,237,679 | 3/1966 | Best | 126/92 B |
| 3,299,938 | 1/1967 | Bally et al. | 431/210 |
| 3,329,139 | 7/1967 | Vezzoli | 126/92 C |
| 3,525,325 | 8/1970 | Perl | 431/329 |
| 3,844,270 | 10/1974 | Black | 431/215 |

Primary Examiner—Carroll B. Dority, Jr.
Attorney, Agent, or Firm—John C. Smith, Jr.

[57] ABSTRACT

A radiant burner comprises a burner housing containing a plurality of heat transfer elements which are heated by the hot combustion product gases produced by the burner. The burner housing is arranged to direct the combustible air-gas mixture into contact with the heat transfer elements to preheat the combustible air-gas mixture before passing through the burner plate to be burned. Means are provided for directing the hot combustion product gases into contact with the heat transfer elements whereby the heat is transmitted from the combustion air-gas mixture through the heat transfer elements to preheat the combustible air-gas mixture in the burner housing.

23 Claims, 7 Drawing Figures

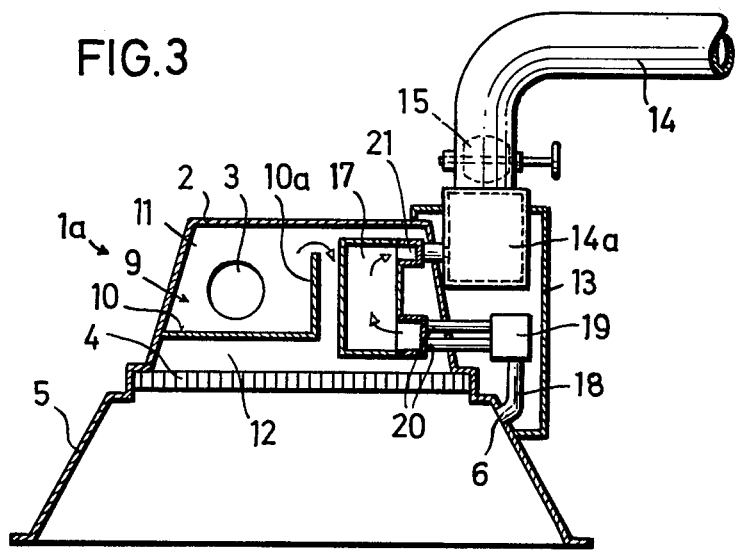
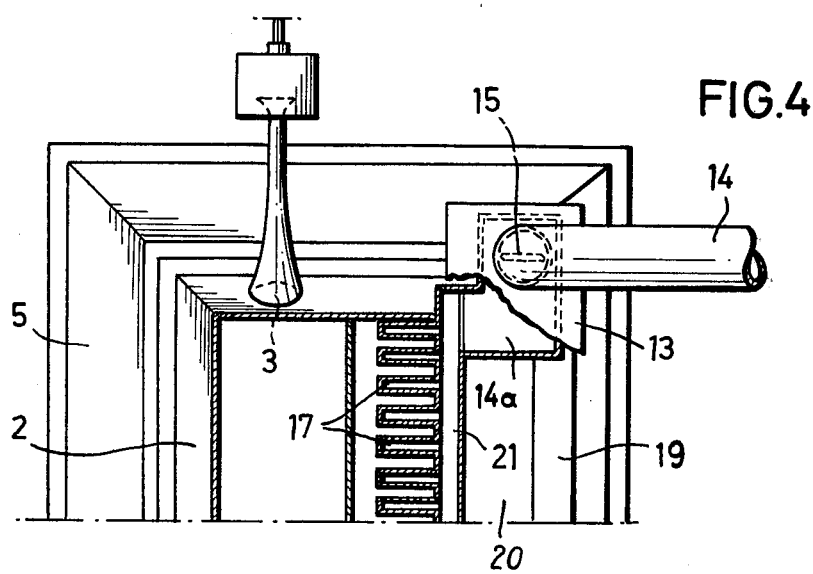

RADIANT BURNER

This is a continuation of my copending application Ser. No. 877,431 filed Feb. 13, 1978 and now abandoned.

This invention relates to a radiant burner of improved design providing more efficient heat output.

Prior art radiant burners comprise a burner housing having a perforated burner plate extending across one side thereof. Combustible gas and air or a combustible gas-air mixture is fed into the burner housing and through the burner plate where it is ignited to generate heat. It has been proposed to improve the efficiency of radiant burners by arranging the feed line for the combustion air or combustible gas-air mixture directly above outlet apertures in a shield extending from the housing about the burner plate through which the waste gases from the burner pass. The hot waste gases flow upwardly into contact with the feed line to preheat the combustion air or combustible gas-air mixture before it is fed into the burner. Although the feed line outside the burner housing acts as a heat exchanger, the efficiency of the heat exchange and the resultant saving in energy is limited.

An object of the present invention is to improve the operating efficiency of radiant burners and realize a substantial increase in saving of energy.

A further object of the invention is to substantially increase and intensify the heat exchange between the hot combustion product or waste gases and the combustible gas and air or a combustible air-gas mixture prior to combustion in a radiant burner.

A still further object of the invention is to provide a radiant burner construction wherein the heat exchanger is incorporated in the radiant burner housing such that the combustible air-gas mixture is heated by the hot combustion product or waste gases through the heat exchanger after the combustible gas and air or combustible air-gas mixture has been fed into the burner housing and immediately prior to combustion.

The foregoing and other objects and advantages of the invention will be more fully explained with reference to the accompanying drawings in which:

FIG. 3 is a partial cross-sectional schematic view of a radiant burner in accordance with a further embodiment of the invention;

FIG. 4 is a partial cross-sectional schematic plan view of the radiant burner of FIG. 3.

Figure 1:
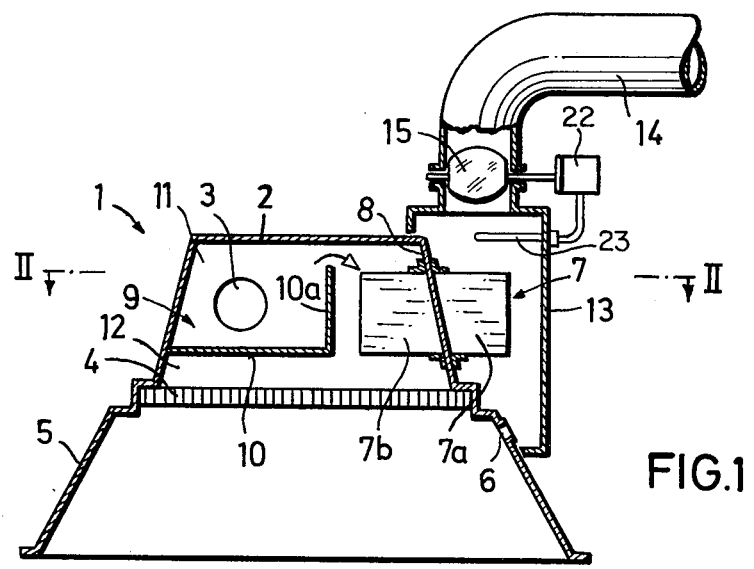
FIG. 1 is a cross-sectional schematic view of a radiant burner in accordance with one embodiment of the invention.
Figure 2:
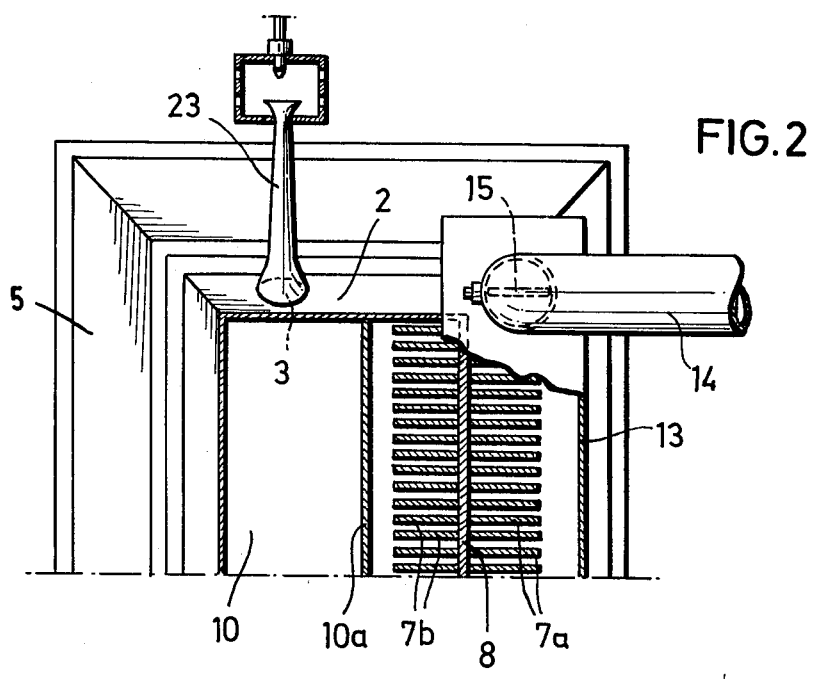
FIG. 2 is a partial cross-sectional schematic plan view of the radiant burner of FIG. 1 taken along the line II—II of FIG. 1.

Referring to FIGS. 1 and 2, the radiant burner shown generally at 1 includes a burner housing 2 having one or more perforated burner plates 4 extending across the bottom side thereof. Combustible gas and air or a combustible gas-air mixture is fed into the burner housing through one or more inlets 3. A shield or skirt 5 projects downwardly and outwardly from the burner housing about the burner plate 4, and a plurality of outlets 6 are located along the length of the shield 5 through which the hot combustion product or waste gases, which collect within the shield 5, are exhausted.

Figure 6:
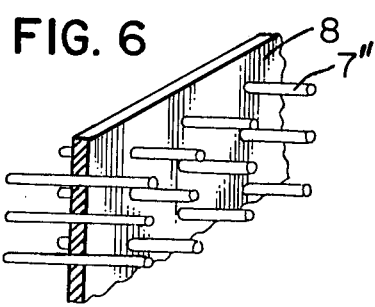
FIGS. 5, 6 and 7 are perspective views, partially in cross-section, of alternative forms of heat transfer elements.
Figure 5:
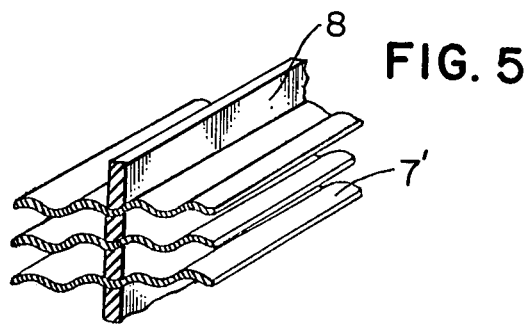
Figure 7:
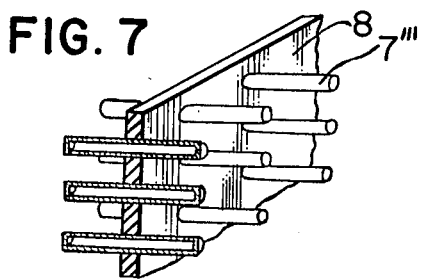

A plurality of heat transfer or exchange elements 7 extend through one wall 8 of the burner housing 2 along the entire length of the burner housing such that portions 7a of the heat transfer elements are located above the waste gas outlets 6 in the ascending waste gas current outside the burner housing 2. A further portion 7b of each of heat transfer elements project into the interior of the burner housing 2. The heat transfer elements 7 may be individual ribs of a highly conductive material such as metal, light metal, copper or the like and may extend transversely and/or longitudinally relative to the burner housing 2. Alternatively, the heat transfer elements 7 may have an undulatory, meandering or corrugated configuration, both interiorally and exteriorally of the burner housing 2 as illustrated at 7' in FIG. 5, the depth of the corrugations being dependent upon the size of the burner housing. Heat transfer elements in the form of pins 7" are illustrated in FIG. 6 and in the form of tubes 7''' in FIG. 7. The hot combustion product or waste gases flow upwardly from the outlets 6 between and about the portions 7a of the heat transfer elements. The combustible air-gas mixture in the burner housing 2 flows downwardly between and about the portions 7b of the heat transfer elements where it is heated by the heat from the hot combustion product or waste gases transmitted through the heat transfer elements 7.

Guide means shown generally at 9 is provided in the burner housing 2 to assure that the combustible air-gas mixture is preheated by the heat transfer elements 7 before passing through the burner plate 4. The guide means comprises guide plates 10 and 10a which form an inlet and distribution chamber 11. The guide plate 10 is spaced from the burner plate 4 providing a clearance 12. The guide plate 10a extends upwardly from the guide plate 10 to a position spaced from the top wall of the burner housing 2. Thus, a passage is provided between the upper edge of guide plate 10a and the top wall of burner housing 2. The combustible gas-air mixture from the inlet or inlets 3 enters the chamber 11 where it is directed away from the burner plate 4 and is caused to flow through the passage indicated by the arrow between the guide plate 10a and the top wall of the burner housing 2 along the entire length of the burner housing 2 into direct contact with heat transfer elements 7 where the combustible gas-air mixture is preheated. Thereafter, the preheated combustible gas-air mixture is distributed over the burner plate 4, part of the mixture passing through clearance 12. Thus, the guide means 9 insures contact of the combustible gas-air mixture along the entire height of the heat transfer elements 7 and consequent maximum preheating of the mixture, the heat from the combustion product or waste gas from outlets 6 passing through the heat transfer elements by thermal conduction.

Preferably, the portions 7a of the heat transfer elements are enclosed in a waste gas housing 13 which extends downwardly to include the outlets 6. An exhaust gas line 14 carries the exhaust gas away from the radiant burner. A control valve 15 is provided in the exhaust line 14 which may be operated by a motor 22 controlled by a thermostat 23 sensitive to the temperature of the waste gas. Thus, if the temperature of the waste gas in exhaust gas line 14 is too high, the valve 15 will at least partially close to reduce the cross-section of the exhaust gas line 14 and increase the residence time of the waste gas at the portions 7a of the heat transfer elements, thereby increasing the amount of heat transferred from the waste gas to the heat transfer elements.

The radiant burner construction of this invention provides remarkably increased efficiency in the transfer of heat from the waste gas to the combustible gas-air mixture. It has been found, for example, that if the waste gas has a temperature of about 340° C. the combustible gas-air mixture in the burner housing 2 may be preheated to a temperature of about 320° C. The heat transfer effected by this arrangement is highly efficient.

Referring to the embodiment of the invention illustrated in FIGS. 3 and 4, heat transfer elements 17 have been substituted for heat transfer elements 7 in FIGS. 1 and 2 and are located entirely within the burner housing 2. The heat transfer elements 17 comprise hollow bodies or ribs through which the hot waste gas may be conducted from the outlets 6 in the shield 5. Conduits 18 connected to outlets 6 extend to a common collector box 19 which extends the entire length of the burner housing. Conduits 20 extend from the collector box 19 to the bottom of each of the hollow ribs. A further collector box 21 is provided at the upper end of the hollow ribs 17 which communicates with a box 14a. The exhaust gas line 14 extends from the box 14a.

In this second embodiment the heat transfer elements located entirely within the burner housing 2 are in direct contact with the hot waste gases flowing from the outlets 6 through conduits 18, common collector box 19 and conduits 20. The preheating of the combustible gas-air mixture inside the burner housing 2 will be improved accordingly. The heat transfer elements 17 as hollow bodies may be of various shapes and may extend transversely and/or longitudinally relative to the burner housing 2. They may be undulatory or may meander along the entire length of the burner housing 2. The hollow heat transfer elements may be tubular in form. As a further modification it is also possible for the collector box 19 to be open at the bottom side, conduits 18 being omitted so that the ascending waste gas current is collected in box 19 from which it is fed through conduits 20 to the hollow heat transfer elements 17 inside the burner housing 2.

The combustible gas and air or gas-air mixture may be fed through a Venturi tube 23 having a trumpet shaped end as shown in FIG. 4. The inlet 3 may be located at either the end or the longitudinal side of the burner housing 2. Preferably, a plurality of inlets should be provided if located on the longitudinal side of the burner housing, in which case the burner housing itself may be subdivided by interior walls separating the flow of combustible air-gas mixture from each of the inlets.

The improved radiant burner design provides substantially improved efficiency in the utilization of the heat from the hot waste gas to preheat the combustible air-gas mixture prior to combustion, thereby substantially increasing the amount of heat generated by the radiant burner. The heat transfer elements are located within the burner housing and at the same time are in direct contact with the hot waste gases resulting in substantially reduced heat loss. Furthermore, the radiant burner arrangement provides for uniform preheating of the combustible air-gas mixture along the entire length of the burner housing.

The guiding means 9 including the inlet and distribution chamber 11 also improves the efficiency of the heat transfer. The combustible gas-air mixture is not fed directly from the inlet or inlets 3 into contact with the heat transfer elements but rather is allowed to settle in the chamber after which the calmed mixture flows over the guide plate 10a in a uniform distribution over the entire length of the burner housing insuring uniform heating of the combustible gas-air mixture by the heat transfer elements.

The embodiment illustrated in FIGS. 3 and 4 provides even greater efficiency since the hollow heat transfer elements extending internally of the burner housing from one wall thereof are in direct contact with both the hot waste gases and the combustible air-gas mixture. The thermostatically controlled valve 15 in the exhaust gas line 14 assures that only after maximum heat energy has been extracted from the waste gas to preheat the combustion gas-air mixture is the waste gas permitted to be exhausted from the radiant burner.

This invention is not to be limited to the exact form shown in the drawings and described in the specification for obviously many changes may be made, some of which are suggested herein.

I claim:

1. A radiant burner comprising:
   (a) a burner housing having an opening therein;
   (b) a burner plate extending across said opening in said housing;
   (c) a shield extending from said burner housing about said burner plate;
   (d) at least one outlet in said shield for conducting combustion product gases therethrough;
   (e) inlet means for feeding combustible gas and air or a combustible air-gas mixture into said burner housing;
   (f) a plurality of heat transfer elements spaced from said inlet means in said burner housing;
   (g) means in said burner housing for directing the flow of said combustible gas-air mixture from said feeding means into contact with said heat transfer elements before passing through said burner plate;
   (i) said combustible gas-air mixture directing means comprising means defining a chamber in said burner housing spaced from said burner plate and from said heat transfer means for receiving the combustible gas-air mixture from said inlet means, said chamber-defining means including outlet means arranged to direct the flow of the combustible gas-air mixture from said chamber into contact with said heat transfer elements before said mixture reaches said burner plate to preheat said combustible gas-air mixture;
   (j) said means defining said chamber comprising a first guide plate in said burner housing between said inlet means and said burner plate and a further guide plate extending from said first guide plate between said inlet means and said heat transfer elements to a position spaced from a wall of said burner housing such that said combustible air-gas mixture is directed from said inlet means through the space between said further guide plate and said wall of said burner housing into contact with said heat transfer elements; and
   (k) means for transmitting heat from said combustion product gases passing through said outlet to said heat transfer elements;
   (h) whereby the heat from said combustion product gases is transmitted through said heat transfer elements to preheat said combustible gas-air mixture in said burner housing.

2. A radiant burner comprising:

(a) a burner housing having an opening therein;
(b) a burner plate extending across said opening in said housing;
(c) a shield extending from said burner housing about said burner plate;
(d) at least one outlet in said shield for conducting combustion product gases therethrough;
(e) inlet means for feeding combustible gas and air or a combustible air-gas mixture into said burner housing;
(f) a plurality of heat transfer elements spaced from said inlet means in said burner housing; and
(g) means for transmitting heat from said combustion product gases passing through said outlet to said heat transfer elements;
(h) said heat transfer elements extending through a wall of said burner housing to a position adjacent to said outlet in said shield whereby said heat transfer elements contact said combustion product gases and transmit heat from said combustion product gases therethrough to preheat said combustible gas-air mixture in said burner housing.

3. A radiant burner comprising:
(a) a burner housing having an opening therein;
(b) a burner plate extending across said opening in said housing;
(c) a shield extending from said burner housing about said burner plate;
(d) at least one outlet in said shield for conducting combustion product gases therethrough;
(e) inlet means for feeding combustible gas and air or a combustible air-gas mixture into said burner housing;
(f) a plurality of heat transfer elements spaced from said inlet means in said burner housing;
(g) means for transmitting heat from said combustion product gases passing through said outlet to said heat transfer elements; and
(h) a waste gas housing for receiving said combustion product gases from said outlet in said shield, exhaust conduit means for directing said combustion product gases away from said radiant burner after contacting said heat transfer elements, a control valve in said waste gas conduit means and thermostatic means responsive to the temperature of said combustion product gases for operating said control valve;
(i) whereby the heat from said combustion product gases is transmitted through said heat transfer elements to preheat said combustible gas-air mixture in said burner housing.

4. A radiant burner comprising:
(a) a burner housing having an opening in the bottom side thereof;
(b) means for feeding combustible gas and air or a combustible air-gas mixture into said housing;
(c) a substantially horizontally disposed burner plate extending across said opening in said burner housing;
(d) an annular shield extending in a generally downwardly direction from the perimeter of said opening in said housing and having a bottom edge;
(e) outlet means in said annular shield extending across substantially an entire one side of said shield on one side of said burner for conducting hot waste gases from below said burner plate; and
(f) heat transfer means comprising a plurality of heat transfer elements extending across substantially the entire side of said burner housing on said one side of said burner, a portion of each of said heat transfer elements projecting into said burner housing and another portion of each of said heat transfer elements projecting above said outlet means in the path of said hot waste gases passing in a substantially upwardly direction by convection from said outlet means;
(g) whereby heat is extracted from said hot waste gases and transmitted to said combustible air-gas mixture in said burner housing by said heat transfer means to preheat said combustible air-gas mixture in said burner housing prior to its passing through said burner plate and the combustion thereof.

5. A radiant burner according to claim 4 further comprising means for guiding said hot waste gases rising by convection from said outlet means into contact with said heat exchange means.

6. A radiant burner according to claim 5 wherein said burner housing and annular shield have polygon configurations.

7. A radiant burner according to claim 6 wherein said guiding means comprises means defining a chamber containing said outlet means and the portions of each of said heat transfer elements projecting over said outlet means.

8. A radiant burner according to claim 7 further comprising an outlet in said chamber above said heat transfer elements and adjustable control valve means for regulating the rate at which said hot waste gases flow upwardly from said outlet means through said portions of said heat transfer elements.

9. A radiant burner according to claim 4 further comprising means within said burner housing for directing said combustible air-gas mixture from said feeding means through said heat exchange means toward said burner plate.

10. A radiant burner according to claim 4 wherein said heat transfer means comprises at least one hollow transfer element contained within said burner housing, said radiant burner further comprising duct means extending from said outlet means to said at least one hollow heat transfer element to guide said hot waste gases from said outlet means through said at least one hollow heat transfer element.

11. A radiant burner according to claim 10 further comprising outlet duct means extending from said at least one hollow heat transfer element and adjustable control valve means for regulating the rate at which said hot waste gases flow upwardly from said outlet means through said at least one hollow heat exchange element.

12. A radiant burner according to claim 11 further comprising means within said burner housing for directing said combustible air-gas mixture from said feeding means through said heat exchange means toward said burner plate.

13. A radiant burner according to claim 4 comprising means in said burner housing for directing the flow of the combustible gas-air mixture from said feeding means into contact with said heat transfer elements before passing through said burner plate.

14. A radiant burner according to claim 4 further comprising means for directing said combustion product gases from said outlet in said shield into contact with said heat transfer elements.

15. A radiant burner according to claim 14 further comprising exhaust means for directing said combustion product gases away from said heat transfer elements.

16. A radiant burner according to claim 13 wherein said combustible gas-air mixture directing means comprises means defining a chamber in said burner housing spaced from said burner plate and from said heat transfer means for receiving the combustible gas-air mixture from said inlet means, said chamber-defining means including outlet means arranged to direct the flow of the combustible gas-air mixture from said chamber into contact with said heat transfer elements before said mixture reaches said burner plate to preheat said combustible gas-air mixture.

17. A radiant burner according to claim 4 wherein said heat transfer elements are hollow elements, conduit means extending from said outlet in said shield to said hollow elements being provided for conducting said combustion product gases into said hollow elements to transfer heat therefrom through said hollow elements to preheat said combustible air-gas mixture in said burner housing.

18. A radiant burner according to claim 4 further comprising a waste gas housing for receiving said combustion product gases from said outlet in said shield and exhaust conduit means for directing said combustion product gases away from said radiant burner after contacting said heat transfer elements.

19. A radiant burner according to claim 4 wherein said heat transfer elements are ribs extending transversely relative to said burner housing.

20. A radiant burner according to claim 4 wherein said heat transfer elements are ribs extending longitudinally relative to said burner housing.

21. A radiant burner according to claim 4 wherein said heat transfer elements have an undulating configuration.

22. A radiant burner according to claim 4 wherein said heat transfer elements are pins.

23. A radiant burner according to claim 4 wherein said heat transfer elements are tubes.

* * * * *